Oct. 27, 1964      T. E. LARKIN      3,154,672
REMOTE GAS METER
Original Filed July 17, 1957
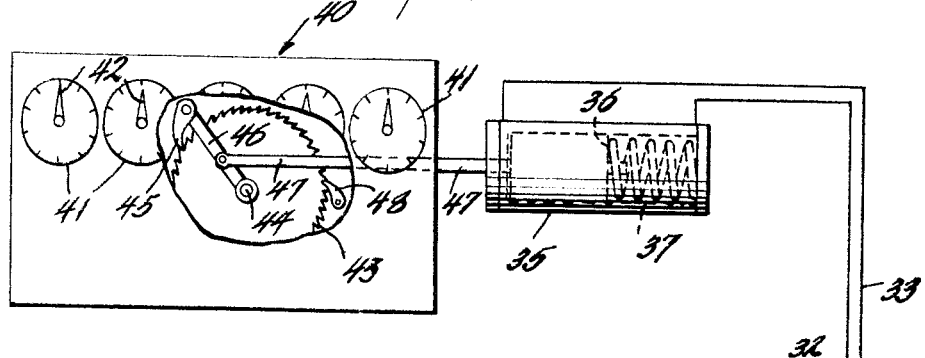
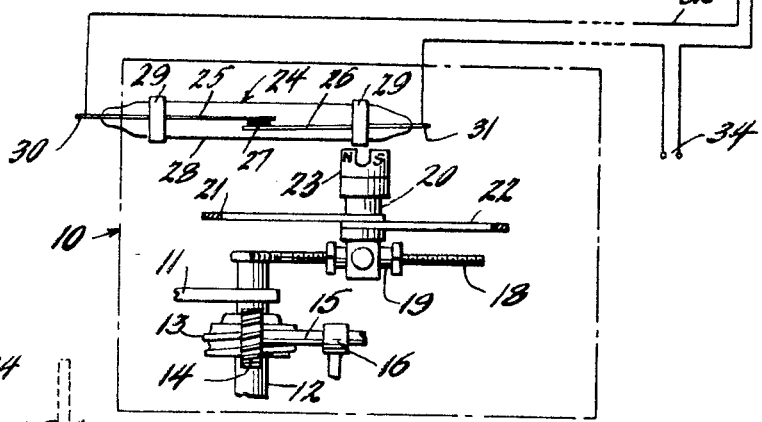
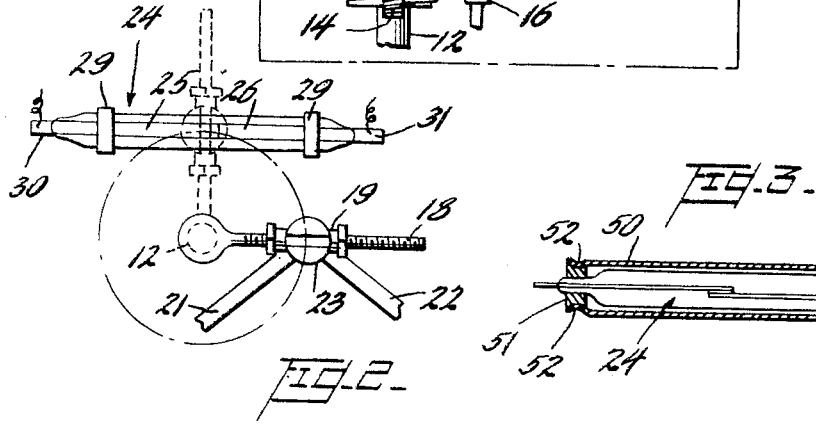
INVENTOR
Thomas E. Larkin
BY
Watson, Cole, Grindle & Watson
ATTORNEY

United States Patent Office 3,154,672
Patented Oct. 27, 1964

3,154,672
REMOTE GAS METER
Thomas E. Larkin, Schenectady, N.Y.,
Continuation of application Ser. No. 672,484, July 17, 1957. This application July 3, 1963, Ser. No. 295,588
1 Claim. (Cl. 235—92)

This application is a continuation of the parent application Ser. No. 672,484, filed on July 17, 1957, now abandoned.

This invention relates to the field metering devices and is more particularly concerned with the provision at some remote point of an indication corresponding to the reading of the registering mechanism of a gas meter and the like.

While the present invention is especially useful in association with gas meters and will be described in this connection, its utility is by no means limited to this single application; it can be readily adapted to or associated with other types of metering devices where the need for a remote indication is either necessary or desirable.

It is well known, of course, that in more or less densely populated areas, gas is ordinarily piped from a central source of supply to the premises of each individual consumer. It is thus necessary that the consumption of gas for each consumer be individually and separately determined in order that he may be charged only for that amount of gas that was actually used by him. This is ordinarily accomplished by providing on such premises a meter which measures and registers the volume of gas flowing through it. In contrast to other types of utility meters, water meters for example, it is usually necessary that a gas meter be disposed at a location which is shielded from the outside atmosphere, this being necessary to prevent extreme temperature fluctuations from influencing the accuracy of the meter, and, as a result, gas meters are usually located at some point in the interior of the premises, such as the basement. In this location, the meter is inaccessible to reading from the exterior of the house and the usual practice is for the utility company to employ persons whose duty it is to go from premise to premise and record the indication on the register of the meter.

Most housewives are all too familiar with the monthly visit of the "gas man" which requires that she interrupt whatever she may be doing to admit him to the premises and then, after he has recorded the reading of the meter, to check on his departure. While "meter readers" are ordinarily persons of honesty and integrity, it is only natural that the housewife feels somewhat ill at ease while a comparative stranger is within her house or apartment, and, even where over a period of time she has come to appreciate that the reader is a person to be trusted, his visit nevertheless is a source of inconvenience to her. Furthermore, the reader is frequently unable to gain admittance to the premises, due to the absence of persons who could admit him, so that he must either return at some later time or leave a form to be filled out and returned to the utility company by the consumer, or else the company must submit its bill based on an estimated consumption, which, in turn, requires that an adjustment be made in the consumer's account when the true meter reading can be determined.

From these considerations, it will be appreciated how desirable it would be if the registering mechanism of the meter could be read from the exterior of the premises at which the meter was located even though the meter itself might be disposed within those premises and, through the years, various suggestions have been made as to how this desideratum could be achieved. All of these previous suggestions, however, have entailed more or less extensive alterations in the working mechanism of the meter itself or elaborate telemetering devices for transferring the indication of the register mechanism to some remote point. It is, therefore, the primary object of the present invention to provide an extremely simple and inexpensive remote indicating device which can be associated with a conventional gas meter with virtually no alteration in the meter itself.

Another object of the present invention is to provide a device of the type described which is constructed of readily obtainable mass-produced components to minimize the expense of the device and can be installed in a conventional gas meter without deleting, materially altering or substituting any of the elements of the conventional meter.

Another object of this invention is to provide a remote indicating device which does not introduce appreciable additional resistance to the operation of the working mechanism of the meter.

Other objects and advantages of the invention will be apparent from the following detailed description when read in connection with the accompanying drawings, in which:

FIGURE 1 is a view of the present invention in association with related elements of a conventional gas meter wherein the meter elements and the pulse-generating elements of the present invention are shown in side elevation while the remote indicating elements of the invention are shown schematically;

FIGURE 2 is a plan view taken generally along line 2—2 of FIGURE 1; and

FIGURE 3 is a detailed view in longitudinal section of a modified form of switch which is adapted for use in the present invention.

In FIGURE 1 of the drawings, the numeral 10 designates a dotted-line enclosure which is representative of the casing of a conventional gas meter. Mounted within this casing in suitable bearings, one of which is shown at 11, for rotation about its own axis is a shaft 12 carrying a worm 13. Worm 13 is in meshing engagement with a worm gear 14 fixedly secured to one end of a shaft 15 extending generally at right angles to shaft 12. Shaft 15 is journalled within a bearing 16 and is connected to the registering mechanism (not shown) of the conventional meter so that rotation of shaft 15 actuates the registering mechanism. At the extreme end of shaft 12 is attached for rotation therewith one end of a threaded rod 18, extending at right angles to the axis of shaft 12, and a nut 19 is disposed on shaft 18 for thread-wise adjustment along its length. Shaft 18 and nut 19 constitute, in effect, a crank arm of adjustable length. Nut 19 is formed with a short stud or stub shaft 20 upstanding therefrom to which is pivoted the ends of two links 21 and 22, respectively. As is well known, links 20 and 21 are connected at their other ends by suitable arms to the measuring bellows of the conventional gas meter and as the bellows expands and contracts due to the passage of gas therethrough, the links are moved in such a way as to rotate rod 18 and shaft 12 which, in turn, rotates shaft 15 to actuate the registering mechanism of the meter. Up to this point, the elements described have been those which are found in the typical gas meter.

In accordance with the present invention, a small permanent magnet 23, preferably formed of Alnico alloy, is affixed to the upper end of stud 20 so that as rod 18 rotates, the magnet moves in a circular path, shown in dotted lines in FIGURE 2. Mounted a slight distance above the plane occupied by the upper surfaces of the magnet throughout its movement in this circular path is a sealed switch generally designated 24. Switch 24 consists of leaf spring members 25 and 26, respectively, formed of fine steel or other ferro-magnetic metal, which overlap to some extent at the inner ends thereof, each of the adjacent faces of the overlapping portions being provided with an overlay, indicated at 27, of a noble metal, such as platinum, which serves as an electrical contact. Spring members 25 and 26 are pre-tensioned so as to normally maintain the contacts apart. The entire switch assembly is sealed in a glass envelope or sheath 28 with the ends of the spring members 25 and 26 remote from noble metal contacts 27 projecting exteriorly therefrom, as at 30 and 31, to permit the attachment of conductors. Switch 24 is preferably disposed so that as the magnet passes beneath the blades of the switch the poles of the magnet are in line with the blades. In this position, the strongest magnetic action is obtained. As the magnet moves in its circular path and passes underneath switch 24, it will attract steel spring members 25 and 26, bringing them together and closing contacts 27. For the switch to be closed in this fashion, it is, of course, necessary that the contacts be spaced apart in the direction of the magnet, which is to say, that the contacts and magnet are in alignment.

The manner in which the switch is mounted within the casing depends largely on the particular meter. Clips, indicated at 29, or other appropriate connection, can be employed.

To the exterior ends 30, 31 of spring members 24 and 25 are connected electrical conductors 32 and 33 which are energized from an appropriate source of electrical current 34, such as a step-down transformer energized from the house circuit of the premises. Conductors 32 and 33 extend from the meter to the desired remote location of the remote indicating mechanism and are connected at their far ends to the windings of a solenoid 35 which includes a plunger or armature 36 biased to the left in FIGURE 1 by means of a spring 37. The numeral 40 indicates the remote registering mechanism having the usual dials 41 and indicators 42 which are actuated in a well known manner by means of a ratchet wheel 43 mounted for rotation about a fixed shaft 44. Ratchet wheel 43 is rotated in fixed small increments by means of a pawl 45 pivotally carried at one end of a lever 46 which is, in turn, pivoted to shaft 44. Lever 46 is actuated by the armature 36 of solenoid 35 by means of a connecting link 47. The number of teeth on wheel 43 and the degree of rotation of wheel 33 for each actuation of the solenoid is selected so as to advance the registering mechanism the same extent as the conventional mechanism is advanced for each rotation of shaft 12.

From the description up to this point, it will be readily understood that as switch 24 is closed by magnet 23, the circuit from electrical source 34 to solenoid 35 will be completed, energizing solenoid 35 and moving armature 36 as well as lever 46 and pawl 45 to the right in FIGURE 1. After the magnet has passed from the vicinity of switch 24, contacts 27 will be separated by spring members 25 and 26, thus ending the flow of current to solenoid 35. As this occurs, spring 37 biases armature 36 to the left in FIGURE 1 to its non-energized position which moves ratchet wheel around to the extent determined by the throw of armature 36, the angularity of lever 46 relative to link 47, and the location of the axis of connection between link 47 and lever 46. The movement of ratchet wheel 43, of course, changes the position of indicators 42 on the dials 41. Ratchet wheel 43 is preferably held against rotation in a reverse direction by means of a locking pawl 48.

Although there is little or no reason to fear the breakage of the frangible glass envelope 28 of switch 24, as the switch is not in a position to be contacted by other parts of the mechanism, a double measure of protection may be provided, if desired, by employing the type of switch illustrated in FIGURE 3. In accordance with this modification, switch 24 is enclosed within a thin aluminum tube 50 into the ends of which are inserted rubber bushings 51, serving to hold the tube in permanent spaced relationship with the glass envelope of the switch. The ends of the tube are crimped into the bushings, as at 52, to prevent accidental removal of the bushings. In most cases, the use of this modified type of switch as an extraordinary measure of protection will not be required since even if the glass envelope 28 of switch 24 were to become fractured the chances of explosion would be quite remote due to the fact that the area of the meter in which the switch is disposed is ordinarily sealed from the area through which gas flows.

The present invention quite obviously provides a number of important advantages. First, as a sealed switch is employed, the danger of an explosion is virtually eliminated without the necessity for elaborate measures to seal entire mechanisms or areas of the meter. A second and quite important advantage is that the present invention does not add any appreciable additional frictional or torque load to the operating mechanism of the meter, as the weight of the magnet is entirely negligible and there is no positive mechanical connection between the magnet and other parts of the indicating mechanism. Third, the magnet is quite small and can be attached merely by means of an adhesive or by a small screw to the pivot stud of a conventional meter without any alteration or transformation of the parts of the meter. Finally, all of the components which are required for the present invention are mass-produced and are readily available at low cost on the current market.

In some cases, it is possible that the remote location at which the remote registering mechanism is to be disposed might be at such a distance or at such an inaccessible point as to make the use of conductors impractical, and in such cases, it is contemplated that the remote registering mechanism be actuated by means of radio waves. This could be accomplished by having the switch, when closed, energize a high-frequency oscillator which generates an impulse of limited duration and providing at the remote location a receiving mechanism tuned to pick up the impulse from the oscillator, this impulse serving to actuate the registering mechanism. Such an arrangement would, however, be considerably more expensive to install than that described in detail and would not, therefore, be ordinarily employed except to fulfill some special requirement.

The form of the invention that has been selected for purposes of detailed illustration and description will quite obviously be capable of and adapted for various minor alterations and modifications both in design and details of construction. For instance, other types of switches could be employed or the positions of the magnet and switch reversed. Consequently, the scope of the invention is to be considered as limited only as required by the claim hereto appended.

What is claimed is:

A remote registering system for a gas meter or the like having a member periodically movable in a fixed path about an axis, consisting of a permanent magnet with closely adjacent north and south poles, defining a magnetic gap between the poles mounted on said member remote from said axis, with the gap carried thereby in a circular path concentric with said axis, a hermetically sealed switch with a set of contacts pretensioned in an open position including at least one longitudinally disposed contact supporting member of ferromagnetic material which is movable to close said set of contacts, said ferromagnetic member being located tangential with a portion of said path and in line with said poles to intercept the magnetic gap between said poles for magnetic closure and opening of the contacts by action of both poles of said magnet only once as the gap moves to said position tangential with said switch, means connected to said switch for establishing a single electrical signal upon closure of said switch, remote totalizing means and means connected to said remote totalizing means and operated in response to said electrical signal to actuate said totalizing means only once each time the magnetic gap passes said tangentially disposed movable contact member.

References Cited in the file of this patent

UNITED STATES PATENTS

| | | |
|---|---|---|
| 475,399 | Holt | May 24, 1892 |
| 1,530,936 | Greenwood | Mar. 24, 1925 |
| 2,207,506 | Cox | July 9, 1940 |
| 2,448,779 | Crise | Sept. 7, 1948 |
| 2,529,481 | Brewer | Nov. 14, 1950 |

OTHER REFERENCES

"Typical Applications," a brochure from Potter Instrument Company, Inc., 136—56 Roosevelt Ave., Flushing, New York, August 2, 1949 (all pages relied on).